US012589790B2

(12) United States Patent
Rolling-Smith

(10) Patent No.: US 12,589,790 B2
(45) Date of Patent: Mar. 31, 2026

(54) CART COVER DEVICE

(71) Applicant: Tia Rolling-Smith, Anderson, IN (US)

(72) Inventor: Tia Rolling-Smith, Anderson, IN (US)

( * ) Notice: Subject to any disclaimer, the term of this patent is extended or adjusted under 35 U.S.C. 154(b) by 305 days.

(21) Appl. No.: 18/447,678

(22) Filed: Aug. 10, 2023

(65) Prior Publication Data

US 2024/0059340 A1     Feb. 22, 2024

Related U.S. Application Data

(60) Provisional application No. 63/398,874, filed on Aug. 18, 2022.

(51) Int. Cl.
B62B 5/06          (2006.01)
(52) U.S. Cl.
CPC .................................... B62B 5/069 (2013.01)
(58) Field of Classification Search
CPC ................................. B62B 5/069; B62B 5/60
See application file for complete search history.

(56) References Cited

U.S. PATENT DOCUMENTS

| | | | |
|---|---|---|---|
| 5,238,293 A | | 8/1993 | Gibson |
| 5,820,142 A | * | 10/1998 | Duer ......................... A61L 2/22 |
| | | | 150/154 |

| | | | |
|---|---|---|---|
| 6,065,764 A | * | 5/2000 | Moseley ................... B62B 5/06 |
| | | | 280/33.993 |
| 6,817,066 B1 | * | 11/2004 | Williams .............. B62B 3/1456 |
| | | | 16/110.1 |
| 6,848,743 B1 | | 2/2005 | Collins |
| 7,100,982 B2 | | 9/2006 | Lundgren |
| 8,714,215 B2 | * | 5/2014 | Badgley ................ E05B 1/0069 |
| | | | 224/411 |
| 9,676,406 B1 | * | 6/2017 | Kocurek ................. B62B 3/146 |
| 2008/0258528 A1 | | 10/2008 | Bush |
| 2008/0303230 A1 | * | 12/2008 | Somberg ................... B62B 5/06 |
| | | | 16/435 |
| 2020/0398883 A1 | * | 12/2020 | Sisson ................... E05B 1/0069 |
| 2022/0340189 A1 | * | 10/2022 | Erickson ................ B62B 5/069 |

* cited by examiner

*Primary Examiner* — John D Walters
(74) *Attorney, Agent, or Firm* — Brennan, Manna & Diamond, LLC

(57)                    ABSTRACT

A cart cover device is disclosed that comprises a body component comprised of a protective tube. The body component of the device is then placed around the handle of a shopping cart and secured to prevent contact of the user's hand with the possibly contaminated handle. Once placed on the shopping cart handle, the body component would conform to the handle and allow the user to use the handle as they would without the cover. Thus, the device is designed to prevent contamination from the pathogens found on cart handles.

19 Claims, 3 Drawing Sheets

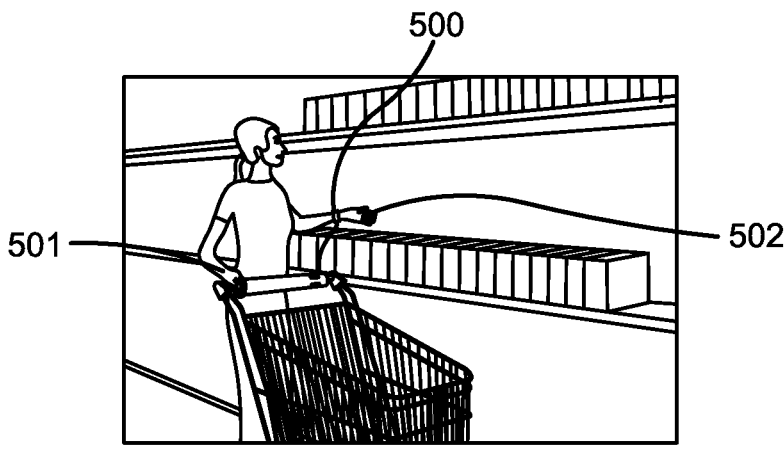

| Providing a cart cover device comprising a tube-like body component | 600 |

↓

| Picking out a conventional shopping cart at the establishment | 602 |

↓

| Unrolling the body component to a wider surface area | 604 |

↓

| Securing the body component with hook and loop fasteners | 606 |

↓

| Zipping the small pocket closed | 608 |

↓

| Attaching the wristband to the user | 610 |

↓

| Utilizing the cart cover while shopping or transporting items in a cart | 612 |

FIG. 6

CART COVER DEVICE

CROSS-REFERENCE TO RELATED APPLICATION

The present application claims priority to, and the benefit of, U.S. Provisional Application No. 63/398,874, which was filed on Aug. 18, 2022, and is incorporated herein by reference in its entirety.

FIELD OF THE INVENTION

The present invention relates generally to the field of cart cover devices. More specifically, the present invention relates to a flexible barrier for convenient application to shopping cart handles. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in cart cover devices. Generally, germs, bacteria, and viruses are commonly spread through contact with diseased surfaces. Further, shopping carts that are not consistently cleaned can have long-term consequences for shoppers who could contract serious illnesses from handling the carts.

Shopping carts are commonly used in retail establishments to transport groceries and other items from shelves or other types of storage or display facilities to a checkout counter and from the establishment to a transportation vehicle. A conventional shopping cart includes a frame mounted on a plurality of wheels and a metal or plastic basket. A handle extends from one end of the basket to enable a user to push the shopping cart throughout the establishment to which the shopping cart belongs. An infant seat may be recessed in the basket adjacent to the handle to support a toddler or small child during shopping.

During shopping, groceries or other items are placed in the basket. A user typically grips the handle on the basket with his or her bare hands as the user pushes the cart. Studies have shown that shopping carts, specifically the shopping cart handle, harbor more bacteria than public toilets due to the presence of bodily fluids and meat drippings. Germs from users who are or have been sick and have used the cart may also contaminate the handle.

One of the solutions that has been used to remove potential contaminants from shopping carts includes periodical hosing of the shopping carts with pressurized water. However, pressurized water fails to adequately remove the contaminants from the carts. Another solution includes periodically wiping the handle of the shopping cart with a rag or disposable wipe. This method, however, is seldom used and when it is used, it tends to merely push the bacteria along the handle and activate the growth of new bacteria, rather than remove the bacteria from the handle.

Therefore, a shopping cart handle cover which can be placed over the handle of a shopping cart to prevent contamination of a user's hands as the user grips the shopping cart handle through the cover is needed. Accordingly, a need remains for a shopping cart handle cover that can bar users from the contamination of a shopping cart handle. Further, a shopping cart handle cover is necessary to protect against harmful germs, bacteria, or viruses that reside on the shopping cart handles.

Therefore, there exists a long-felt need in the art for a cart cover device that provides users with a flexible barrier for convenient application to shopping cart handles. There is also a long-felt need in the art for a cart cover device that features a small, zippered pocket that can be used to accommodate small personal items, along with a coupon organizer to hold coupons while shopping. Further, there is a long-felt need in the art for a cart cover device that reduces the spread of germs, viruses, and bacteria, and ensures the user can shop with peace of mind. Moreover, there is a long-felt need in the art for a device that eliminates the need for individuals to wipe down and sanitize a handle before use. Further, there is a long-felt need in the art for a cart cover device that enables users to wash, sanitize, and reuse the covers after use to maximize protection against airborne pathogens while shopping. Finally, there is a long-felt need in the art for a cart cover device that utilizes a wrist attachment to prevent the user from forgetting the device.

The subject matter disclosed and claimed herein, in one embodiment thereof, comprises a cart cover device. The device is a specialized cart cover that can be placed around any type of cart handle in order to prevent contamination of any pathogen that might exist on the bare handle. The cart cover device comprises a body component comprised of an antimicrobial, antibacterial, water-resistant, waterproof, or any protective tube-like substance. Typically, the tube within the body component would be approximately sixteen to twenty-three inches long and four to six inches wide but can be any suitable size. The body component of the device is then placed around the handle of a shopping cart to prevent contact of the user's hand with the possibly contaminated handle. Once placed on the shopping cart handle, the body component would conform to the handle and allow the user to use the handle as they would without the cover. The body component can be secured around the cart handle via hook and loop fasteners or any suitable securing means as is known in the art. Thus, the device is designed to prevent contamination from the pathogens found on cart handles.

In this manner, the cart cover device of the present invention accomplishes all of the foregoing objectives and provides users with a device that provides maximum comfort and protection for a user. The device is a tube that is placed around a cart handle. The device can be manufactured of an antimicrobial or antibacterial substance that conforms to the shape of a cart handle.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cart cover device. The device is a specialized tube cover that can be placed around any type of shopping cart handle in order to prevent contamination from substances found on the handle. The cart cover device comprises a body component comprised of an antimicrobial, antibacterial, water-resistant, waterproof, or any other protective substance for contamination prevention. The cart cover device also comprises a small, zippered pocket and a wrist attachment. Thus, the device is designed to protect the user from any pathogens that could be present on the handle.

Generally, the invention is directed to a contamination prevention cart cover device for shopping cart handles. The cart cover device provides prevention from contaminants and pathogens. When used as a cover for shopping cart handles, the body component provides a perfectly molded fit, while lowering the risk of contracting diseases from anything on the cart handle and not impeding the use of the shopping cart handle. In addition to safety, the small pouch of this invention creates a more convenient and useful cart handle than conventional shopping cart handles or covers.

In one embodiment, the cart cover device is used with any type of shopping cart, basket, or stroller known in the art. Typically, the cart in use with the cart cover device would comprise a cage, with an open top, a smaller basket attached that could seat a small child, and a handle attached to the lateral edge of the cage. The cage and handle may be made of known types of relatively rigid plastic material or metal.

In one embodiment, the cart cover device comprises a body component having a generally elongated, rectangular bottom component and a generally elongated, rectangular top component which may be generally parallel to the bottom component. The body component also comprises a set of opposing side walls, both front and back walls as well as left and right walls. Typically, the front and back side walls are secured together around the handle. The body component can comprise any suitable shape and dimensions, such that it substantially surrounds the shopping cart handle, preferably the body component would be approximately sixteen to twenty-three inches long and four to six inches wide.

In one embodiment, the generally, rectangular body component is curved around the shopping cart handle and secured in a cylindrical shape, completely encompassing the handle. In another embodiment, the generally, rectangular body component is made of a stiff material such that it forms a resting C-shape that has a C-curve component and an opening such that the opening can be placed around the shopping cart handle and secured.

In one embodiment, the body component of the cart cover device is secured around a shopping cart handle during use. The cart cover device can be fabricated of various, flexible materials, such as heat-sealable plastic or polymers, such as polypropylene or acrylonitrile-butadiene-styrene (ABS), or any other suitable material as is known in the art, such as, but not limited to, polycarbonate, polyethylene, polyethylene terephthalate, polyvinyl chloride, polystyrene, etc. The cart cover device should also be made of antibacterial or anti-microbial material or have a housing comprised of a coating that is antibacterial or antimicrobial.

In one embodiment, the front and back side walls can be secured together around the handle via any suitable fasteners as is known in the art, such as a hook and loop fastener, adhesive tapes, zipper, or any other suitable fastener, etc.

In one embodiment, the body component of the device contains a small pocket within the top component. This small pocket can be opened and closed at any time with a zipper or any other suitable fastener. It should be made of the same material as the body component and fitted into the top component of the handle cover. The small pocket can be any suitable size as is known in the art, and would typically hold such items such as keys, coupons, smartphones, money, credit cards, debit cards, etc. In one embodiment, the small pocket would have slots for a user's credit cards as well.

In one embodiment, it should be appreciated that the body component of the cart cover device is constructed in such a manner to match the curvature of the shopping cart handle when applied to the handle. The shape and size of the body component may be adjusted to best suit the handle's shape, size, and purpose, as well.

In one embodiment, the body component is attached to a wrist attachment that completely surrounds the user's wrist keeping the user connected to the body component. This wrist attachment can be flexible cords or any other suitable material which would allow for comfort and flexibility between the user and the body component. In another embodiment, the wrist attachment is detachable from the body component, so as to be utilized at the discretion of the user. The connection between the wrist attachment and the body component could be any kind of securing materials as is stated supra, such as hook and loop fasteners, adhesive tape, or any other suitable material.

In one embodiment, the body component comprises a carrying strap that can be secured to the device and removed, as necessary for easy transportation of the device.

Further, in one embodiment, the material used for the body component can vary in elasticity. The body component can be completely elastic and thus, would require no fasteners between the front and back side walls, as the elastic material would completely surround the handle and secure itself there.

In one embodiment, the body component can be manufactured from a disposable material so that the user may dispose of the cart cover device after each use. This would prevent the user from having to sanitize the cart cover device after each use.

In one embodiment, the body component can be enclosed by a fabric cover that can slide over the cart cover device. This fabric could be washable and can have any aesthetically pleasing decor the user sees fit, such as patterns, designs, or images. In another embodiment, instead of fabric, the cover can be made of a disposable material for purposes of disposal after use.

While shopping, the cart cover device can be placed around the handle of a shopping cart or other basket being used to carry items. This cover would prevent any contaminants that might be found on the shopping cart handle from transferring onto the user's hands, thus keeping the user safe from disease, illness, and contamination.

It is understood that this cover technology would be used in several other types of carts and/or baskets, such as smaller baskets, small grocery carts, and even children's strollers, etc. It should also be appreciated that the cart cover device of this invention forms to whichever handle it is covering, thus protecting the user from any pathogens surrounding all parts of the handle.

In yet another embodiment, the cart cover device comprises a plurality of indicia.

In yet another embodiment, a method of protecting a user from contaminants and pathogens while shopping is disclosed. The method includes the steps of providing a cart cover device comprising a tube-like body component. The method also comprises picking out a conventional shopping cart at the establishment. Further, the method comprises unrolling the body component to a wider surface area. The method also comprises securing the body component with hook and loop fasteners around a shopping cart handle. Further, the method comprises zipping the small pocket closed. The method also comprises attaching the wristband to the user. Finally, the method comprises utilizing the cart cover device while shopping or transporting items in a cart.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 5 illustrates a perspective view of one embodiment of the cart cover device of the present invention showing the cover device with the wristband attached during use in accordance with the disclosed architecture;

FIG. 6 illustrates a flowchart showing the method of protecting a user from contaminants from shopping cart handles in accordance with the disclosed architecture.

DETAILED DESCRIPTION OF THE PRESENT INVENTION

Figures 1, 2:
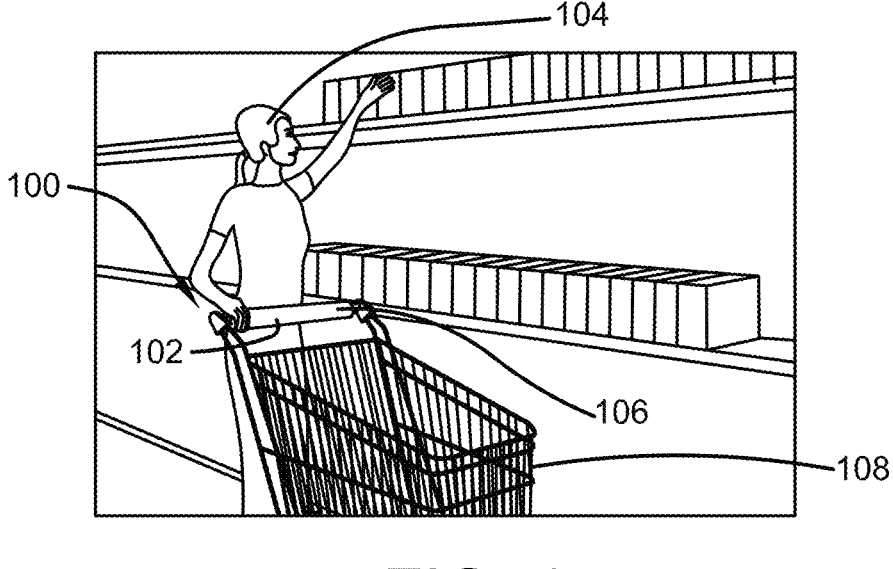
FIG. 1 illustrates a perspective view of one embodiment of the cart cover device of the present invention showing the cover device around a shopping cart handle being used in accordance with the disclosed architecture.
FIG. 2 illustrates a perspective view of one embodiment of the cart cover device of the present invention showing the cover device close-up during use in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a cart cover device that provides users with a flexible barrier for convenient application to shopping cart handles. There is also a long-felt need in the art for a cart cover device that features a small, zippered pocket that can be used to accommodate small personal items, along with a coupon organizer to hold coupons while shopping. Further, there is a long-felt need in the art for a cart cover device that reduces the spread of germs, viruses, and bacteria and ensures the user can shop with peace of mind. Moreover, there is a long-felt need in the art for a device that eliminates the need for individuals to wipe down and sanitize a handle before use. Further, there is a long-felt need in the art for a cart cover device that enables users to wash, sanitize, and reuse the covers after use to maximize protection against airborne pathogens while shopping. Finally, there is a long-felt need in the art for a cart cover device that utilizes a wrist attachment to prevent the user from forgetting the device.

The present invention, in one exemplary embodiment, is a novel cart cover device. The device is a specialized cart cover that can be placed around any type of cart handle in order to prevent contamination of any pathogen that might exist on the bare handle. The cart cover device comprises a body component configured in the shape of a tube. The body component of the device is then placed around the handle of a shopping cart and secured to prevent contact of the user's hand with the possibly contaminated handle. Once placed on the shopping cart handle, the body component would conform to the handle and allow the user to use the handle as they would without the cover. Thus, the device is designed to prevent contamination from the pathogens found on cart handles. The present invention also includes a novel method of protecting a user from contaminants from shopping cart handles. The method includes the steps of providing a cart cover device comprising a body component with a tube component. The method also comprises picking out a conventional shopping cart at the establishment. Further, the method comprises unrolling the body component to a wider surface area. The method also comprises securing the body component with hook and loop fasteners around a shopping cart handle. Further, the method comprises zipping the small pocket closed. The method also comprises attaching the wristband to the user. Finally, the method comprises utilizing the cart cover device while shopping or transporting items in a cart.

Referring initially to the drawings, FIG. 1 illustrates a perspective view of one embodiment of the cart cover device 100 of the present invention. In the present embodiment, the cart cover device 100 is an improved cart cover device 100 that prevents contamination from substances found on the handle 106 of a shopping cart 108. Further, the device 100 is a cover that is placed around any type of shopping cart 108 to help provide users 104 with a flexible barrier from pathogens. Specifically, the cart cover device 100 comprises a body component 102 that can fully extend and wrap around the handle 106 for coverage. Thus, the device 100 is designed to protect the user 104 from any surface pathogens or contaminants.

Generally, the invention is directed to a contamination prevention cart cover device 100 for shopping cart handles 106. The cart cover device 100 provides prevention from contaminants and pathogens. When used as a cover for shopping cart handles 106, the body component 102 provides a perfectly molded fit while lowering the risk of contracting diseases from anything on the cart handle 106 and not impeding the use of the shopping cart handle 106. In addition to safety, the small pouch 300 of this invention creates a more convenient and useful cart handle 106 than conventional shopping cart handles 106 or covers.

Further, the cart cover device 100 is used with any type of shopping cart 108, basket, or stroller known in the art. Typically, the cart 108 in use with the cart cover device 100 would comprise a cage with an open top, a smaller basket attached that could seat a small child, and a handle attached to the lateral edge of the cage. The cage and handle may be made of known types of relatively rigid plastic material or metal.

As shown in FIG. 2, the cart cover device 100 comprises a body component 102 having a generally elongated, rectangular bottom component 200 and a generally elongated, rectangular top component 202 which may be generally parallel to the bottom component 200. The body component 102 also comprises a set of opposing side walls 204 and 205, both front and back walls 204 as well as left and right walls 205. Typically, the front and back side walls 204 are secured together around the handle 106. The body component 102 can comprise any suitable shape and dimensions such that it substantially surrounds the shopping cart handle 106, preferably the body component 102 would be approximately sixteen to twenty-three inches long and four to six inches wide.

Furthermore, it should be appreciated that the body component 102 of the cart cover device 100 is constructed in such a manner to match the curvature of the shopping cart handle 106 when applied to the handle 106. The shape and size of the body component 102 may be adjusted to best suit the handle's shape, size, and purpose, as well.

Additionally, the body component 102 can be manufactured from a disposable material so that the user 104 may dispose of the cart cover device 100 after each use. This would prevent the user 104 from having to sanitize the cart cover device 100 after each use.

Further, the body component 102 can be enclosed by a fabric cover 206 that can slide over the cart cover device 100. The fabric cover 206 should be washable and can have any aesthetically pleasing decor 207 the user 104 sees fit, such as patterns, designs, or images. Also, instead of fabric 206, the cover can be made of a disposable material for purposes of disposal after each use.

Figure 3:
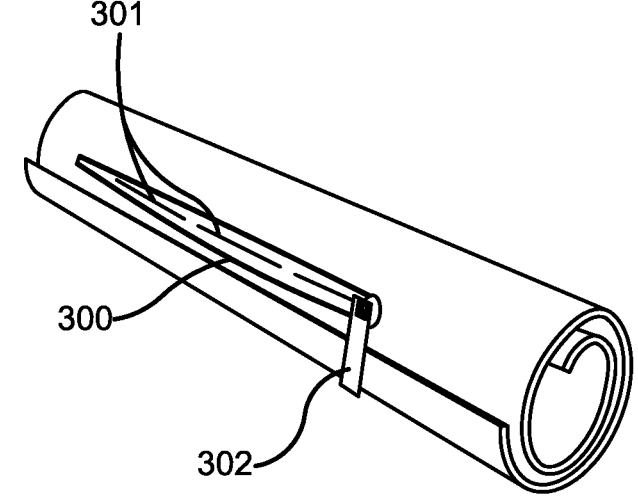
FIG. 3 illustrates a perspective view of one embodiment of the cart cover device of the present invention showing the cover device with a zippered pocket to accommodate small items.

As shown in FIG. 3, the body component 102 of the device 100 comprises a small pocket 300 within the top component 202. This small pocket 300 can be opened and closed at any time with a zipper 302 or any other suitable fastener. It should be made of the same material as the body component 102 and fitted into the top component 202 of the handle cover 100. The small pocket 300 can be any suitable size as is known in the art, and can secure such items such as keys, coupons, smart phones, money, credit cards, debit cards, etc. Further, the small pocket 300 can also include slots 301 for a user's credit cards.

Figure 4:
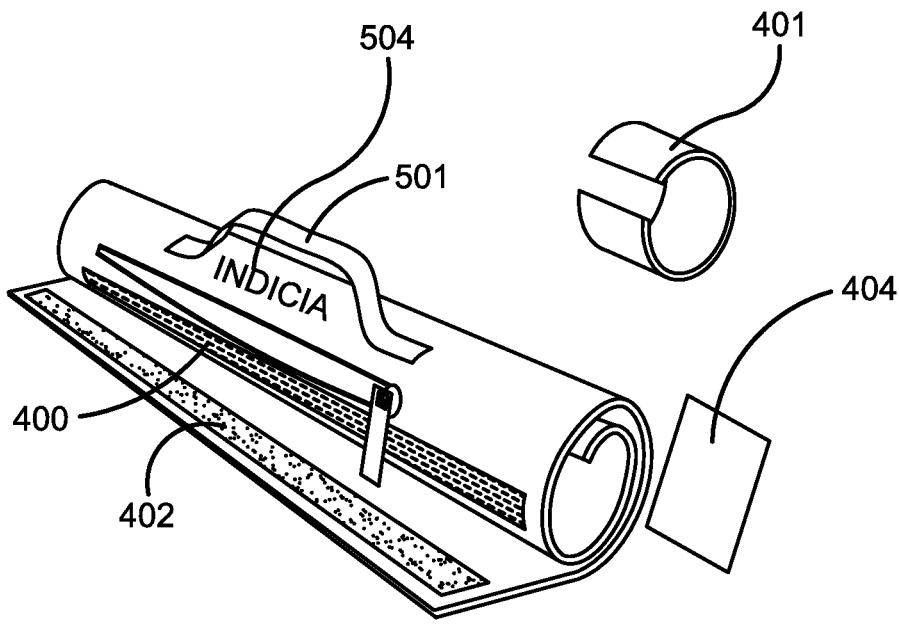
FIG. 4 illustrates a perspective view of one embodiment of the cart cover device of the present invention showing the cover device with a close-up view of the hook and loop fasteners.

As shown in FIG. 4, the generally rectangular body component 102 is curved around the shopping cart handle 106 and secured in a cylindrical shape completely encompassing the handle 106. The generally rectangular body component 102 could also be made of a stiff material, such that it forms a resting C-shape that has a C-curve component 401 and an opening 400, such that the opening 400 can be placed around the shopping cart handle 106 and secured.

Further, the body component 102 of the cart cover device 100 is secured around a shopping cart handle 106 during use. The cart cover device 100 can be fabricated of various, flexible materials, such as heat-sealable plastic or polymers, such as polypropylene or acrylonitrile-butadiene-styrene (ABS), or any other suitable material as is known in the art, such as, but not limited to, polycarbonate, polyethylene, polyethylene terephthalate, polyvinyl chloride, polystyrene, etc. The cart cover device 100 should also be made of antibacterial or antimicrobial material or comprise a coating that is antibacterial or antimicrobial.

Additionally, the front and back side walls 204 can be secured together around the handle 106 via any suitable fasteners as is known in the art, such as a hook and loop fastener 402, adhesive tapes, zipper 302, or any other suitable fastener, depending on the needs and/or wants of a user 104.

Further, the material used for the body component 102, can vary in elasticity. The body component 102 can be completely elastic and thus, would require no fasteners between the front and back side walls 204, as the elastic material would completely surround the handle 106 and secure itself there.

Additionally, the body component 102 can comprise additional components, such as a coupon organizer 404 which is secured around the body component 102. The coupon organizer 404 can be any suitable shape and size as is known in the art and acts to retain a variety of coupons, shopping lists, etc.

As shown in FIG. 5, the body component 102 is attached to a wrist attachment 500 that completely surrounds the user's wrist 501 keeping the user 104 connected to the body component 102. This wrist attachment 500 can be flexible cords or any other suitable material which would allow for comfort and flexibility between the user 104 and the body component 102. Similarly, the wrist attachment 500 is detachable from the body component 102, so as to be utilized at the discretion of the user 104. The connection between the wrist attachment 500 and the body component 102 could be any kind of securing materials as is stated supra, such as hook and loop fasteners 402, adhesive tape, or any other suitable material.

Furthermore, the body component 102 comprises a carrying strap 501 that can be secured to the device 100 and removed, as necessary for easy transportation of the device 100. The strap 501 would be secured via a snap, Velcro, a pin, etc.

While shopping, the cart cover device 100 can be placed around the handle 106 of a shopping cart 108 or other basket being used to carry items. This cover 100 would prevent any contaminants that might be found on the shopping cart handle 106 from transferring onto the user's hands 502, thus keeping the user 104 safe from disease, illness, and contamination.

It is understood that this cover technology would be used in several other types of carts and/or baskets, such as small baskets, small shopping carts, children's strollers, etc. It should also be appreciated that the cart cover device 100 of this invention forms to whichever handle 106 it is covering, thus protecting the user 104 from any pathogens surrounding all parts of the handle 106.

In yet another embodiment, the cart cover device comprises a plurality of indicia 504. The body component 102 of the device 100 may include advertising, a trademark, or other letters, designs, or characters, printed, painted, stamped, or integrated into the body component 102, or any other indicia 504 as is known in the art. Specifically, any suitable indicia 504 as is known in the art can be included, such as, but not limited to, patterns, logos, emblems, images, symbols, designs, letters, words, characters, animals, advertisements, brands, etc., that may or may not be shopping, safety, or brand related.

FIG. 6 illustrates a flowchart of the method of protecting a user from contaminants and pathogens while shopping is disclosed. The method includes the steps of at 600, providing a cart cover device comprising a tube-like body component. The method also comprises at 602 picking out a conventional shopping cart at the establishment. Further, the method comprises at 604 unrolling the body component to a wider surface area. The method also comprises at 606 securing the body component with hook and loop fasteners around a shopping cart handle. Further, the method comprises at 608 zipping the small pocket closed. The method also comprises at 610 attaching the wristband to the user. Finally, the method comprises at 612 utilizing the cart cover device while shopping or transporting items in a cart.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "cart cover device," "cover device", and "device" are interchangeable and refer to the cart cover device 100 of the present invention.

Notwithstanding the foregoing, the cart cover device 100 of the present invention can be of any suitable size and configuration as is known in the art without affecting the overall concept of the invention, provided that it accomplishes the above-stated objectives. One of ordinary skill in the art will appreciate that the cart cover device 100 as shown in FIGS. 1-6 are for illustrative purposes only, and that many other sizes and shapes of the cart cover device 100 are well within the scope of the present disclosure. Although the dimensions of the cart cover device 100 are important design parameters for user convenience, the cart cover device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cart cover device that protects a user from contaminants and pathogens during shopping, the cart cover device comprising:
   a body component; and
   a fastener;
   wherein the body component is secured around a shopping cart handle during use;
   wherein the body component is attached to a wrist attachment which surrounds a user's wrist and is secured to the body component by fasteners;
   and
   further wherein the body component provides safety from contaminants found on the shopping cart handle.

2. The cart cover device of claim 1, wherein the body component comprises a rectangular bottom component and a rectangular top component which is parallel to the rectangular bottom component.

3. The cart cover device of claim 2, wherein the body component comprises opposing right and left side walls and opposing front and back side walls, wherein the opposing front and back side walls are secured together by the fastener.

4. The cart cover device of claim 3, wherein the body component is made of flexible material to allow the body component to wrap around the shopping cart handle.

5. The cart cover device of claim 3, wherein the body component is made from a disposable material.

6. The cart cover device of claim 3, wherein the body component is enclosed by a washable or disposable fabric cover.

7. The cart cover device of claim 1, wherein the body component comprises a small pocket with slots disposed within the rectangular top component that can be secured with a fastener.

8. The cart cover device of claim 1, wherein the body component is made of stiff material in a resting C-shape.

9. The cart cover device of claim 1, wherein the body component is made of elastic material and secured without fasteners.

10. The cart cover device of claim 1, wherein the wrist attachment is made of a coiled flexible cord that is sewn into the body component and wrapped around the user's wrist.

11. The cart cover device of claim 1 further comprising a plurality of indicia.

12. A cart cover device that protects a user from contaminants and pathogens during shopping, the cart cover device comprising:
   a body component that comprises a rectangular bottom component, a parallel rectangular top component, opposing left and right side walls, and opposing front and back side walls; and
   a hook and loop fastener which secures the opposing front and back side walls together;
   wherein the body component is made of flexible material;
   wherein the body component comprises a small pocket in the rectangular top component; wherein the small pocket is closed by a zipper;
   wherein the body component comprises a removable carrying strap;
   wherein the body component is attached to a wrist attachment secured to the body component and around a user's wrist;
   wherein the body component is secured around a shopping cart handle during use; and
   further wherein the body component provides safety from contaminants found on the shopping cart handle.

13. The cart cover device of claim 12 further comprising a coupon organizer secured around the body component.

14. The cart cover device of claim 12, wherein the body component is made of a stiff material in a resting C-shape.

15. The cart cover device of claim 12, wherein the body component is made of an elastic material and secured without fasteners.

16. The cart cover device of claim 12, wherein the wrist attachment is made of a coiled flexible cord that is sewn into the body component and wrapped around the user's wrist.

17. The cart cover device of claim 12, wherein the body component is made from a disposable material.

18. The cart cover device of claim 12, wherein the body component is enclosed by a washable or disposable fabric cover that comprises décor for aesthetic purposes.

19. A method of protecting a user from contaminants and pathogens while shopping, the method comprising the following steps:

providing a cart cover device comprising a tube-like body component, a wristband and a small pocket;

picking out a shopping cart at an establishment;

unrolling the body component to a wider surface area;

securing the body component with hook and loop fasteners around a shopping cart handle;

zipping the small pocket closed;

attaching the wristband to the user; and utilizing the cart cover device while shopping or transporting items in the shopping cart.

\* \* \* \* \*